A. W. STEPHENS.
BOTTLE CAP REMOVER.
APPLICATION FILED DEC. 10, 1910.

982,893.

Patented Jan. 31, 1911.

Witnesses

Inventor:
A. W. Stephens

UNITED STATES PATENT OFFICE.

AUGUSTUS W. STEPHENS, OF WALTHAM, MASSACHUSETTS.

BOTTLE-CAP REMOVER.

982,893.  Specification of Letters Patent.  Patented Jan. 31, 1911.

Application filed December 10, 1910. Serial No. 596,693.

*To all whom it may concern:*

Be it known that I, AUGUSTUS W. STEPHENS, of Waltham, in the county of Middlesex and State of Massachusetts, have invented certain new and useful Improvements in Bottle-Cap Removers, of which the following is a specification.

This invention relates to a device adapted to be carried in a garment pocket and to be used in removing crimped crowns or caps from bottles, the devices comprising a handle portion or holder which is usually chambered to receive and serve as a sheath for a corkscrew, and a lifting dog pivoted to the holder and projecting from one side of the latter between its ends, the relative arrangement of the dog to the holder being such that the end of the holder at one side of the dog constitutes the shorter arm, and the end of the holder at the opposite side of the dog constitutes the longer arm, of a lever adapted to coöperate with the dog in removing a cap from a bottle.

My invention has for its object to provide an improved means for pivotally connecting the dog with the holder in such manner as to prevent liability of splitting the holder, which is usually made of wood, during the operation of removing a cap, and to prevent the dog from projecting outside the periphery of the holder when the device is carried in the pocket.

The invention consists in the improvements which I will now proceed to describe and claim.

Figure 1:
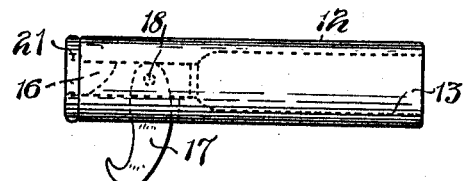
Figure 2:
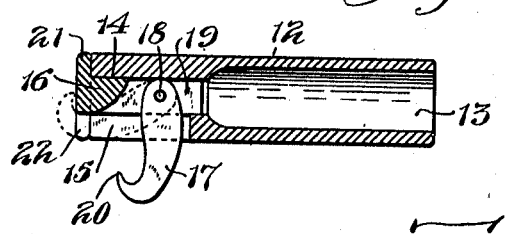
Figures 3, 4:
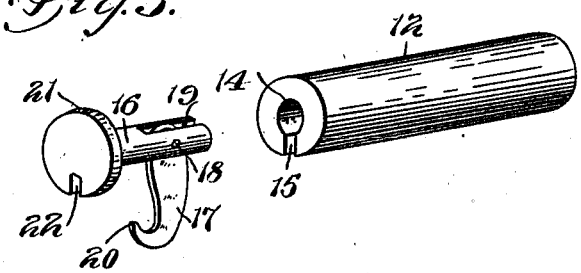
Figure 5:
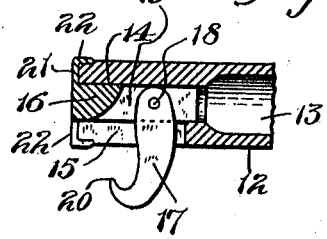

Of the accompanying drawings which form a part of this specification,—Figure 1 represents a side view of a bottle cap remover embodying my invention; Fig. 2 represents a longitudinal section of the same; and Figs. 3 and 4 represent perspective views of the component parts of the device, and Fig. 5 represents a sectional view showing a flange on the head of the anchoring member.

Similar reference characters indicate the same or similar parts in all the figures.

In the drawings, 12 represents a holder which is preferably a cylindrical wooden rod elongated so that its length considerably exceeds its diameter. One end of the holder may be provided with a socket 13 of sufficient diameter to receive the spiral shank of a corkscrew. In the opposite end of the holder is formed a socket 14 which is preferably of smaller diameter than the socket 13 and may extend into the latter, as shown by Fig. 2, the holder being therefore open from end to end. In one side of the holder is formed a slot 15 which extends from the socket 14 to the periphery of the holder and through one end of the latter, as shown by Figs. 2 and 4.

16 represents an anchoring member which is a metal rod formed to enter and have a close frictional fit in the socket 14, the length of the member 16 being such that, while it is elongated and presents an extended bearing on the interior of the holder, it does not project into the corkscrew holding socket 13.

17 represents a metal dog, one end of which is connected by a pivot pin 18 with the anchoring member 16, said member being preferably provided with a longitudinal slot 19 in which the inner end of the dog is inserted. The outer end of the dog is formed to engage a bottle cap, one side of the dog being preferably recessed to form a cap-engaging hook 20.

The dog is pivoted to the anchoring member at a point which is spaced from the ends of said member, the arrangement being such that when the parts are assembled the portion of the holder at one side of the pivot 18 constitutes the shorter arm of a lever while the portion at the opposite side of said pivot constitutes the longer arm of said lever. When the said shorter arm is placed upon a bottle cap and the dog is engaged with one end of said cap, an upward pressure on the longer arm will cause the removal of the cap.

The anchoring member projects in opposite directions from the pivot 18, so that the strain exerted on the wooden body of the holder during the operation of removing a cap, is so distributed that there is little liability of splitting the wooden body by the strain exerted on it in lifting the bottle cap.

The anchoring member is preferably provided at its outer end with a head 21, formed to bear on the outer end of the holder 12, and limit the insertion of the anchoring member into the socket 14, said head also constituting a guard for the end of the holder against which it bears. The head 21 is provided with a slot 22 which is in the same plane as the slot 19, and is formed to receive the outer end portion of the dog 17 when the latter is swung inwardly, as indicated by dotted lines in Fig. 2. The hook 20 is offset from the body portion of the dog, one edge of the dog being recessed to form said hook.

The form of the dog is such that it is adapted to be swung inwardly into the slots 15 and 22, as shown by dotted lines in Fig. 2, the back, or outer edge of the dog, being substantially flush with the periphery of the holder 12, so that the only part of the dog which projects from the holder is the outer end, this part projecting only from one end of the holder. The dog therefore does not form any objectionable enlargement or protuberance on the holder tending to wear the pocket in which it is carried.

The head 21 may have a flange 22 (Fig. 5) formed to embrace one end of the holder and serve as a ferrule to prevent the splitting of the said end.

I claim:

1. A bottle cap remover comprising an elongated holder having a longitudinal socket and a slot extending from the socket to the periphery of the holder, an elongated anchoring member shorter than the holder and fitted closely in said socket, and a dog pivoted to said anchoring member and extending through said slot, the outer end of said dog being formed to engage a bottle cap, the said anchoring member having an elongated bearing on the interior of the holder whereby the pressure exerted on the holder by the dog during the operation of removing a bottle cap is distributed.

2. A bottle cap remover comprising an elongated holder having a longitudinal socket and a slot extending from the socket to the periphery of the holder, an elongated anchoring member shorter than the holder and fitted closely in said socket, said anchoring member having a head adapted to bear on one end of the holder and limit the insertion of the anchoring member into the socket, and a cap-engaging dog pivoted to the anchoring member and extending through said slot.

3. A bottle cap remover comprising an elongated holder having a longitudinal socket and a slot extending from the socket to the periphery of the holder, an elongated anchoring member shorter than the holder and fitted closely in said socket, said anchoring member having a head at its outer end bearing on one end of the holder and provided with a slot, and a dog pivoted to the anchoring member and extending through the slot in the holder, one edge of the dog being recessed to form a cap-engaging hook and to permit the dog to swing into the slots in the holder and head, the form of the hook being such that when it occupies said slots its outer edge is substantially flush with the external surface of the holder and the periphery of the head.

4. A bottle cap remover comprising an elongated holder having a longitudinal socket and a slot extending from the socket to the periphery of the holder, an elongated anchoring member shorter than the holder and fitted closely in said socket, said anchoring member having a head adapted to bear on one end of the holder and provided with a flange surrounding said end, and a cap-engaging dog pivoted to the anchoring member and extending through said slot.

In testimony whereof I have affixed my signature, in presence of two witnesses.

AUGUSTUS W. STEPHENS.

Witnesses:
C. F. BROWN,
JAS. H. CHURCHILL.